(12) United States Patent
Sharp et al.

(10) Patent No.: US 8,938,602 B2
(45) Date of Patent: Jan. 20, 2015

(54) MULTIPLE SETS OF ATTRIBUTE FIELDS WITHIN A SINGLE PAGE TABLE ENTRY

(75) Inventors: Colin Christopher Sharp, San Diego, CA (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/565,434

(22) Filed: Aug. 2, 2012

(65) Prior Publication Data
US 2014/0040593 A1 Feb. 6, 2014

(51) Int. Cl.
*G06F 12/00* (2006.01)
*G06F 13/00* (2006.01)

(52) U.S. Cl.
USPC ........... 711/206; 711/100; 711/154; 711/202; 711/203; 711/205; 711/207

(58) Field of Classification Search
None
See application file for complete search history.

(56) References Cited

U.S. PATENT DOCUMENTS

| | | | |
|---|---|---|---|
| 6,286,092 B1 | 9/2001 | Frank et al. | |
| 6,446,034 B1 | 9/2002 | Egolf | |
| 7,444,636 B2 | 10/2008 | Noel et al. | |
| 7,490,216 B1 | 2/2009 | Chen et al. | |
| 2007/0168644 A1 | 7/2007 | Hummel et al. | |
| 2008/0046666 A1 | 2/2008 | Termaine et al. | |
| 2009/0150620 A1 | 6/2009 | Paver et al. | |
| 2009/0157975 A1 | 6/2009 | Sathaye et al. | |
| 2011/0016290 A1 | 1/2011 | Chobotaro et al. | |
| 2011/0161620 A1 | 6/2011 | Kaminski et al. | |

FOREIGN PATENT DOCUMENTS

WO 2012125202 A1 9/2012

OTHER PUBLICATIONS

International Search Report and Written Opinion—PCT/US2013/051069—ISA/EPO, Dec. 5, 2013, 10 pp.

*Primary Examiner* — Midys Rojas
(74) *Attorney, Agent, or Firm* — Shumaker & Sieffert, P.A.

(57) ABSTRACT

A first processing unit and a second processing unit can access a system memory that stores a common page table that is common to the first processing unit and the second processing unit. The common page table can store virtual memory addresses to physical memory addresses mapping for memory chunks accessed by a job of an application. A page entry, within the common page table, can include a first set of attribute bits that defines accessibility of the memory chunk by the first processing unit, a second set of attribute bits that defines accessibility of the same memory chunk by the second processing unit, and physical address bits that define a physical address of the memory chunk.

28 Claims, 4 Drawing Sheets

MULTIPLE SETS OF ATTRIBUTE FIELDS WITHIN A SINGLE PAGE TABLE ENTRY

TECHNICAL FIELD

The present disclosure generally relates to computing and more particularly relates to techniques for mapping a virtual memory address space to a physical memory address space.

BACKGROUND

Typical computing systems include multiple processing units, such as central processing units (CPUs) and graphics processing units (GPUs), which read from and write to a physical memory. The various processing units of a device may implement virtual addressing schemes such that applications being executed by clients can be assigned a contiguous virtual address space without having to set aside a contiguous physical memory space. Each processing unit typically has a memory management unit (MMU) to translate the virtual memory addresses to physical addresses in the physical memory. To perform the required virtual address to physical address mapping, each MMU maintains a separate page table in system memory, and each of these separate page tables can be several megabytes in size.

SUMMARY

In general, the techniques described in this disclosure are related to computing devices that implement virtual address to physical address mapping. According to the techniques of this disclosure, two or more processing units may share a common page table for mapping virtual addresses to physical addresses. Page table entries of the common page table may include multiple sets of attribute fields, such as an attribute set for a first processing unit, an attribute set for a second processing unit, as well as other attribute sets. Using the multiple sets of attribute fields, the attributes for the two or more processing units may be managed individually. For example, the techniques described in this disclosure may allow for individual management of the read/write access of the first and second processing units, such that the read/write access for one processing unit may be different than the read/write access for a second processing unit.

According to one example, an apparatus includes a first processing unit, a second processing unit, and a memory. The memory stores a common page table that is common to the first processing unit and the second processing unit and stores virtual memory addresses to physical memory addresses mapping for memory chunks accessed by a job. The memory also stores a page entry, within the common page table, that the first processing unit and the second processing unit use to access a memory chunk of the memory chunks, wherein the page entry comprises a first set of attribute bits that defines accessibility of the memory chunk by the first processing unit, a second set of attribute bits that defines accessibility of the same memory chunk by the second processing unit, and physical address bits that define a physical address of the memory chunk.

According to another example, a method includes translating, by a first processing unit, a virtual memory address to a physical memory address using a common page table stored in a memory; accessing, by the first processing unit, a memory chunk identified by the physical memory address; translating, by a second processing unit, the virtual memory address to the physical memory address using the common page table stored in the memory; and, accessing, by the second processing unit, the memory chunk identified by the physical memory address. The common page table is common to the first processing unit and the second processing unit and stores virtual memory addresses to physical memory addresses mapping for memory chunks accessed by a job. The common page table comprises a page entry that the first processing unit and the second processing unit use to access the memory chunk, and the page entry comprises a first set of attribute bits that defines accessibility of the memory chunk by the first processing unit, a second set of attribute bits that defines accessibility of the same memory chunk by the second processing unit, and physical address bits that define a physical address of the memory chunk.

According to another example, an apparatus includes first processing means, second processing means, and a memory. The first processing means comprises means for translating a virtual memory address to a physical memory address using a common page table stored in the memory and means for accessing a memory chunk identified by the physical memory address, and the second processing means comprises means for translating the virtual memory address to the physical memory address using the common page table stored in the memory and means for accessing the memory chunk identified by the physical memory address The common page table is common to the first processing means and the second processing means and stores virtual memory addresses to physical memory addresses mapping for memory chunks accessed by a job. The common page table comprises a page entry that the first processing means and the second processing means use to access the memory chunk, and the page entry comprises a first set of attribute bits that defines accessibility of the memory chunk by the first processing means, a second set of attribute bits that defines accessibility of the same memory chunk by the second processing means, and physical address bits that define a physical address of the memory chunk.

According to another example, a computer-readable storage medium stores instructions that when executed cause a first processing unit and a second processing unit to translate, by the first processing unit, a virtual memory address to a physical memory address using a common page table stored in a memory; access, by the first processing unit, a memory chunk identified by the physical memory address; translate, by the second processing unit, the virtual memory address to the physical memory address using the common page table stored in the memory; and access, by the second processing unit, the memory chunk identified by the physical memory address. The common page table is common to the first processing unit and the second processing unit and stores virtual memory addresses to physical memory addresses mapping for memory chunks accessed by a job. The common page table comprises a page entry that the first processing unit and the second processing unit use to access the memory chunk. The page entry comprises a first set of attribute bits that defines accessibility of the memory chunk by the first processing unit, a second set of attribute bits that defines accessibility of the same memory chunk by the second processing unit, and physical address bits that define a physical address of the memory chunk.

DESCRIPTION

Figure 1:
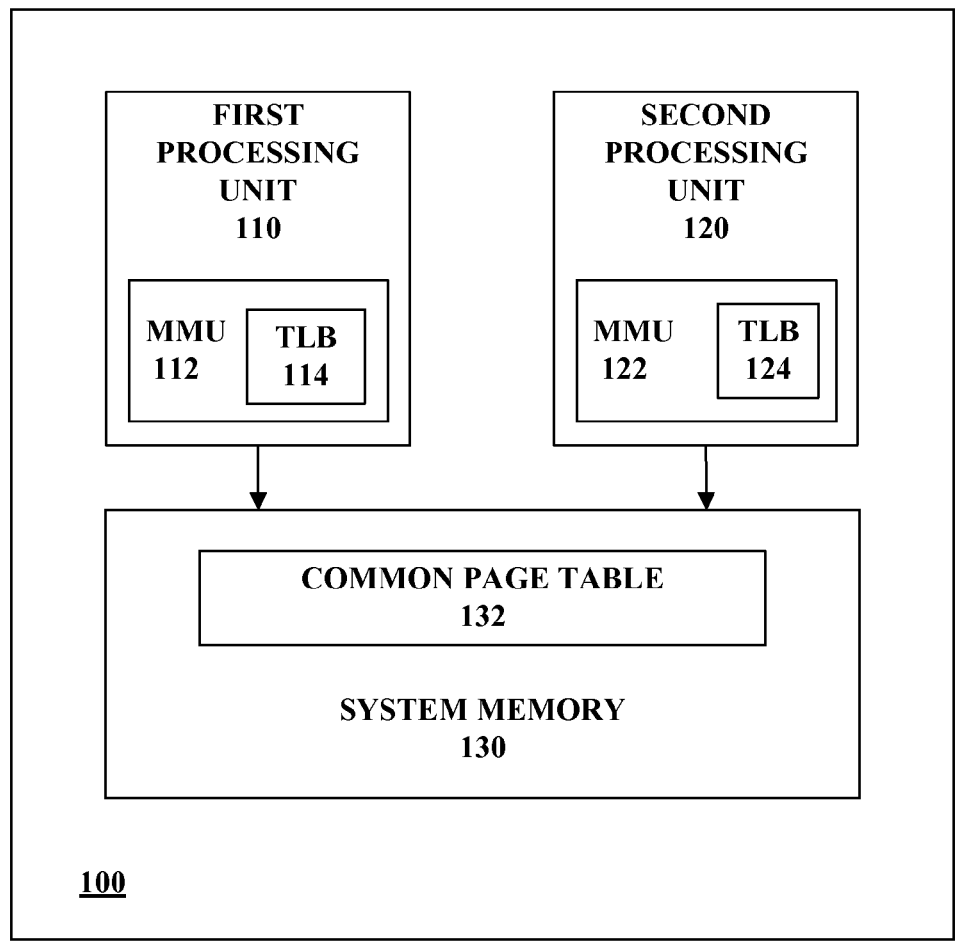
FIG. 1 shows an example of a computing device configured to implement the virtual memory address to physical memory address mapping techniques described in this disclosure.

In general, the techniques described in this disclosure are related to computing devices that implement virtual address to physical address mapping, also referred to in this disclosure as virtual-to-physical mapping. More particularly, the techniques described in this disclosure are directed to a common page table that can be shared by two or more processing units. Page table entries of the common page table may include multiple sets of attribute fields, such as an attribute set for a first processing unit, an attribute set for a second processing unit, as well as other attribute sets. Using the multiple sets of attribute fields, the attributes for the two or more processing units may be managed individually. For example, the read/write access for one processing unit may be different than the read/write access for a second processing unit.

Processing units such as central processing units (CPUs) and graphics processing units (GPUs) require accessing (i.e. reading data from and writing data to) a physical memory. To read or write data, the processing unit accesses the location within the physical memory where the data is to be read from or written to with a physical address for the location within the memory. It may be difficult, however, for the processing unit to manage the physical addresses for all of the memory chunks (i.e., the locations of the physical memory where data can be written to or read from). To overcome this difficulty, the processing unit may use virtual addressing. In virtual addressing, applications executing on the processing unit (i.e., clients) are assigned contiguous virtual memory addresses. An application may comprise multiple jobs, with different jobs executing on different processing units. Each of the processing units includes respective memory management units (MMUs). The MMU of each of the processing units is tasked with determining the actual memory addresses, also referred to as physical memory addresses, from the virtual memory addresses.

For instance, the MMU includes a cache referred to as a translation lookaside buffer (TLB). The TLB stores the virtual-to-physical mapping for selected memory chunks, such as recently accessed memory chunks or frequently accessed memory chunks. To access a memory chunk, the processing unit supplies the virtual memory address for that memory chunk to the MMU. The MMU, in turn, accesses the TLB to identify the physical memory address for that memory chunk. When the mapping is available in the TLB (referred to as a TLB hit), the MMU then accesses the memory chunk using the physical memory address. Alternatively, the MMU supplies the physical memory address to a different unit or module of the processing unit which then accesses the memory chunk using the physical memory address.

In some cases, the TLB may not include mapping for a virtual memory address (referred to as a TLB miss). For example, the processing unit may need to access a memory chunk whose physical address is not included in the page entries stored by the TLB because that memory chunk is not a recently accessed or frequently accessed memory chunk. When this occurs, the processing unit accesses a page table stored in system memory.

A page table is similar to the TLB in that both store page entries mapping virtual memory addresses to physical memory addresses. One page table entry, in the page table or in the TLB, maps one virtual memory address to one physical memory address. The page table, however, is stored in the system memory in contrast to the TLB which is stored locally within the MMU of the processing unit. Also, because the page table stores the entire virtual-to-physical address mapping for the processing unit instead of a limited number of page entries like a TLB, the size of the page table is generally much larger than the size of the TLB. For instance, the size of the page table may be in the megabytes range.

In some techniques, the system memory stores corresponding page tables for each of the processing units. For example, the system memory stores a page table for the CPU and stores another, separate page table for the GPU. In some instances, however, these different page tables include identical page table entries. Thus, it may be possible that multiple page table entries in a CPU page table are identical to page table entries in a GPU page table. For example, a page table entry in the CPU page table may map one virtual memory address to a physical memory address, and a page table entry in the GPU page table may map the same virtual memory address to the same physical memory address.

As one example, an operating system executing on the CPU may be tasked with assigning contiguous virtual memory addresses to an application. The application may include a plurality of jobs or tasks, with some jobs executing on the CPU and some jobs executing on the GPU. The operating system may also store the mapping between virtual memory addresses and physical memory addresses in the page table. Because the operating system is tasked with assigning virtual memory addresses and the mapping of these virtual memory addresses to the physical addresses for both the CPU and GPU, the operating system may create a common page table that stores the virtual-to-physical mapping for both the CPU and GPU.

There may be benefits in the CPU and the GPU sharing such a common page table. For example, rather than the system memory storing duplicate page table entries, the system memory can store a single page entry for the identical page table entries in the CPU page table and GPU page table, which results in memory saving. Furthermore, because there is one page entry for these identical page table entries, it may be more computationally efficient to update a single page table entry instead of two identical page table entries.

Some prior techniques have been developed to achieve page table sharing. In these techniques, the CPU MMU and the GPU MMU each store pointers that point to the location of the common page table in system memory. When the CPU and GPU access a memory chunk, their respective MMUs use their pointers to retrieve the physical memory address from the shared page table. However, these techniques for sharing a page table may sometimes suffer from not identifying the different accessing capabilities of the different processing units for the memory chunks.

Different accessing capabilities may be associated with the different processing units. For instance, a page entry is conventionally 32 bits. The first 12 bits are reserved as attribute bits, and the remaining 20 bits identify the physical memory address. These attribute bits identify the accessing capabilities of the processing unit. As one example, some of the memory chunks may be designated as being readable and writeable, and other memory chunks may be designated as being only readable. One or more bits of the attribute bits enforce this accessibility limitation. There are other examples of bits in the attribute bits in addition to bits that designate a memory chunk as being readable and writeable or just readable. For example, one or more other bits of the attribute bits may indicate that data within certain memory chunks should also be stored in a cache, such as an L2 cache of the processing unit. In this manner, the attribute bits of the page entry may describe the memory chunk addressed by the address bits in the page entry.

In some instances, the attribute bits for one processing unit may need to be different than the attribute bits for another processing unit. For example, the operating system executing on the CPU may designate some chunks as being writeable and readable by the CPU, and designate these same chunks as being only readable by the GPU. For instance, in the example described above where the CPU and the GPU include their own respective page tables, the virtual address to physical address mapping may be identical in each of the page tables, but the attribute bits may not be identical. In the other example described above where the CPU and GPU share a common page table, the attribute bits may be shared by both the CPU and GPU. This forces the operating system to define attribute bits for either the CPU or the GPU, but not both.

For instance, the attribute bits, in the above example, are attribute bits that define the accessibility of the CPU, but not necessarily the accessibility of the GPU. This may potentially lead to mismanagement of a chunk. For example, it may be desirable to limit the accessibility of a memory chunk to only be readable for a GPU. However, because this chunk is readable and writeable by the CPU and the attribute bits do not differentiate between CPU and GPU, the GPU may inadvertently write to the memory chunk, in examples where pointers are used into a common page table.

The techniques of the disclosure are directed to designating attribute bits specifically for different processing units. For example, the GPU attribute bits define the accessibility for the GPU and the CPU attribute bits define the accessibility for the CPU. In this way, the different processing units can share a common page table, and the attribute bits for the GPU describe the accessibility of a memory chunk for the GPU and the attribute bits for the CPU describe the accessibility of the memory chunk for the CPU. Because the attribute bits are specifically designated for the CPU and GPU, the probability of the GPU incorrectly writing to a memory chunk is reduced, while memory savings may be achieved by not requiring different page tables for the CPU and the GPU.

There may be various techniques to designate the attribute bits for the different processing units. For instance, as described above, typically 12 of the 32 bits in a page entry are reserved for attribute bits. The value for many of these 12 bits may be identical for both the GPU and CPU. Of the remaining bits, whose values may be different for the CPU and GPU, the operating system may specifically designate which bits are for the CPU and which bits are for the GPU. For example, the first two bits of the 12 attribute bits may be reserved to indicate whether the memory chunk is writeable, readable, or writeable and readable by the CPU, the next two bits of the 12 attribute bits may be reserved to indicate whether the memory chunk is writeable, readable, or writeable and readable by the GPU, and the remaining eight bits may be common to both the GPU and CPU.

As another example, the page entry may include more than 32 bits (e.g., 40 bits). In this example, the last 20 bits may be reserved for address mapping, and the first 20 bits may be reserved as attribute bits. The first 10 bits of these 20 bits may be reserved for the CPU, and the last 10 bits of these 20 bits may be reserved for the GPU. Alternatively, the first six bits may be reserved for the CPU. The next six bits may be reserved for the GPU, and the next 8 bits may be shared by the CPU and the GPU. These allocations of bits are intended to be examples. The techniques of this disclosure should not be considered limited to the above examples. Although for purposes of explanation some of the techniques of this disclosure are described with reference to a CPU and a GPU, it should be understood that the techniques of this disclosure may also be implemented with other types of processing units.

FIG. 1 shows an example computing device, computing device 100, which may implement the techniques of this disclosure. Examples of computing device 100 include, but are not limited to, mobile wireless telephones, personal digital assistants (PDAs), video gaming consoles, handheld gaming units, mobile video conferencing units, laptop computers, desktop computers, television set-top boxes, digital media players, smartphones, tablet computers, cameras, and the like. Although not restricted only to resource limited devices, the techniques of this disclosure may be of particular benefit to resource limited devices including battery powered devices. The techniques of this disclosure may, for example, improve overall device performance by more efficiently using limited device memory and may reduce computational complexity by maintaining fewer page tables, which may in turn improve the responsiveness of a device as well as reduce power consumption.

Computing device 100 includes a first processing unit 110, a second processing unit 120, and a system memory 130. First processing unit 110 includes MMU 112, and second processing unit 120 includes MMU 122. MMU 110 may include TLB 114, and MMU 122 may include TLB 124. First processing unit 110 may, for example, be a CPU of device 100. Second processing unit 120 may, for example, be a GPU operable to output graphics data for presentation on a display. First processing unit 110 and second processing unit 120 may additionally represent other types of processing units such as processing units for various peripheral devices including display controllers, networking devices, or any type of digital signal processing (DSP) core that offloads signal processing from a processor such as a CPU or GPU. Examples of first processing unit 110 and second processing unit 120 may include, but are not limited to, a digital signal processor (DSP), a general purpose microprocessor, application specific integrated circuit (ASIC), field programmable logic array (FPGA), or other equivalent integrated or discrete logic circuitry. Although the techniques of this disclosure will generally be described with references to two processing units, the techniques may be implemented with more than two processing units.

System memory 130 may be an example of a computer-readable storage medium. System memory 130 may, for example, be a type of random access memory (RAM) such as dynamic RAM, static RAM, thyristor RAM, zero-capacitor RAM, twin transistor RAM, or some other type of volatile memory. System memory 130 may also be a non-volatile memory, such as a flash memory or other type of non-volatile RAM. System memory 130 may store instructions that cause processing unit 110 and processing unit 120 to perform functions ascribed to each in this disclosure. In this way, system memory 130 may be considered as a computer-readable storage medium comprising instructions that cause one or more processors, e.g., processing unit 110 and processing unit 120, to perform various functions. In some examples, however, such instructions may be stored in a memory (not shown in FIG. 1) other than system memory 130.

First processing unit 110 and second processing unit 120 are configured to read data from and write data to system memory 130. To read or write the data, first processing unit 110 and second processing unit 120 are configured to access specific physical locations in system memory 130. These specific locations may, for example, be chunks of 4KB, and each chunk may have its own unique physical address. As introduced above, however, first processing unit 110 and second processing unit 120 may implement virtual addressing, such that applications executing on first processing unit 110 or second processing unit 120 are assigned contiguous virtual memory addresses. The physical memory addresses corresponding to these contiguous virtual memory addresses may, however, be fragmented and non-contiguous. Thus, processing unit 110 and processing unit 120 may process data using these contiguous virtual memory addresses rather than the corresponding non-contiguous physical memory addresses. When processing unit 110 and processing unit 120 need to access (i.e. read from or write to) system memory 130, however, these virtual memory addresses need to be translated to physical memory addresses.

MMU 112 is configured to map virtual memory addresses to physical memory addresses for first processing unit 110, and MMU 122 is configured to map virtual memory addresses to physical memory addresses for second processing unit 120. A complete page table with a full set of page entries is stored in common page table 132. Each of TLB 114 and TLB 124 stores a subset of the page entries stored in common page table 132. The subset may, for example, be recently accessed page entries, frequently accessed page entries, or page entries selected based on some other criteria. The subset of page entries stored in TLB 114 may be different than the subset of page entries stored in TLB 124. For example, the page table entries that are recently accessed or frequently accessed by first processing unit 110 via MMU 112 may be different than the page table entries that are recently or frequently accessed by second processing unit 120 via MMU 122. Thus, TLB 114 may store a different subset of page table entries than TLB 124.

If, for example, first processing unit 110 needs to translate a virtual memory address to a physical memory address, then MMU 112 may use TLB 114 to determine the physical memory address that corresponds to a particular virtual memory address when TLB 114 stores the page entry for that virtual memory address. Using the determined physical memory address, processing unit 110 can read from or write to a particular physical location of system memory 130. Similarly, if second processing unit 120 needs to translate a virtual memory address to a physical memory address, then MMU 122 may use TLB 124 to determine the physical memory address that corresponds to a particular virtual memory address when TLB 124 stores the page entry for that virtual memory address. Using the determined physical memory address, processing unit 120 can read from or write to system memory 130.

As introduced above, TLB 114 and TLB 124 may be caches that store the virtual-to-physical mappings for only a subset of virtual memory addresses. TLB 114, therefore, may not store the entire virtual-to-physical mapping for processing unit 110, and similarly, TLB 124 may not store the entire virtual-to-physical mapping for processing unit 120. In some instances, MMU 112 may need to determine a corresponding physical memory address for a virtual memory address that does not have a mapping stored in TLB 114. To determine a mapping for a virtual memory address not included in TLB 114, first processing unit 110 may access common page table 132 stored in system memory 130. Common page table 132 includes the entire virtual-to-physical mapping for processing unit 110, and therefore, may be much larger than TLB 114 and TLB 124.

As with MMU 112, in some instances MMU 122 may need to determine a corresponding physical memory address for a virtual memory address that does not have a mapping stored in TLB 124. To determine a mapping for a virtual memory address not included in TLB 124, second processing unit 120 accesses common page table 132 stored in system memory 130. In this manner, MMU 122 may function in a substantially similar manner to MMU 112. Common page table 132 includes the entire virtual-to-physical mapping for processing unit 120 as well as for processing unit 110. In this manner, first processing unit 110 and second processing unit 120 share the same page table (i.e. common page table 132 in the example of FIG. 1). Common page table 132 shared by processing unit 110 and processing unit 120 may be smaller than the combined size of two page tables, if MMU 112 and MMU 122 were to maintain separate page tables for processing unit 110 and processing unit 120. Common page table 132 may be smaller than the combined size of two separate page tables because some of the page table entries of common page table 132 are shared by both MMU 112 and MMU 122.

Common page table 132 may include a plurality of page entries that map a virtual memory address to a physical memory address of a memory chunk. A memory chunk may be a portion of system memory 130 that is individually accessible via its physical memory address. Each page entry may include a first set of attribute bits and a second set of attribute bits. The first set of attribute bits may set controls, such as permissions and access rights, for first processing unit 110 while the second set of attribute bits sets controls for second processing unit 120. Each page entry may optionally include one or more additional sets of attribute bits, such as a set of attribute bits that set common controls for both first processing unit 110 and second processing unit 120.

The first set of attribute bits and the second set of attribute bits for page entries of common page table 132 may enable first processing unit 110 and second processing unit 120 to have different permissions and access rights while sharing a common page table. As one example, the first set of attribute bits may be set such that first processing unit 110 has both read and write access to a particular memory chunk of system memory 130, while second processing unit 120 may have only read access to the same particular memory chunk. Of course, other configurations are also possible, such as second processing unit 120 having both read and write access while first processing unit 110 has only read access or one of first processing unit 110 and second processing unit 120 having both read and write access while the other has neither read nor write access.

Figure 2:
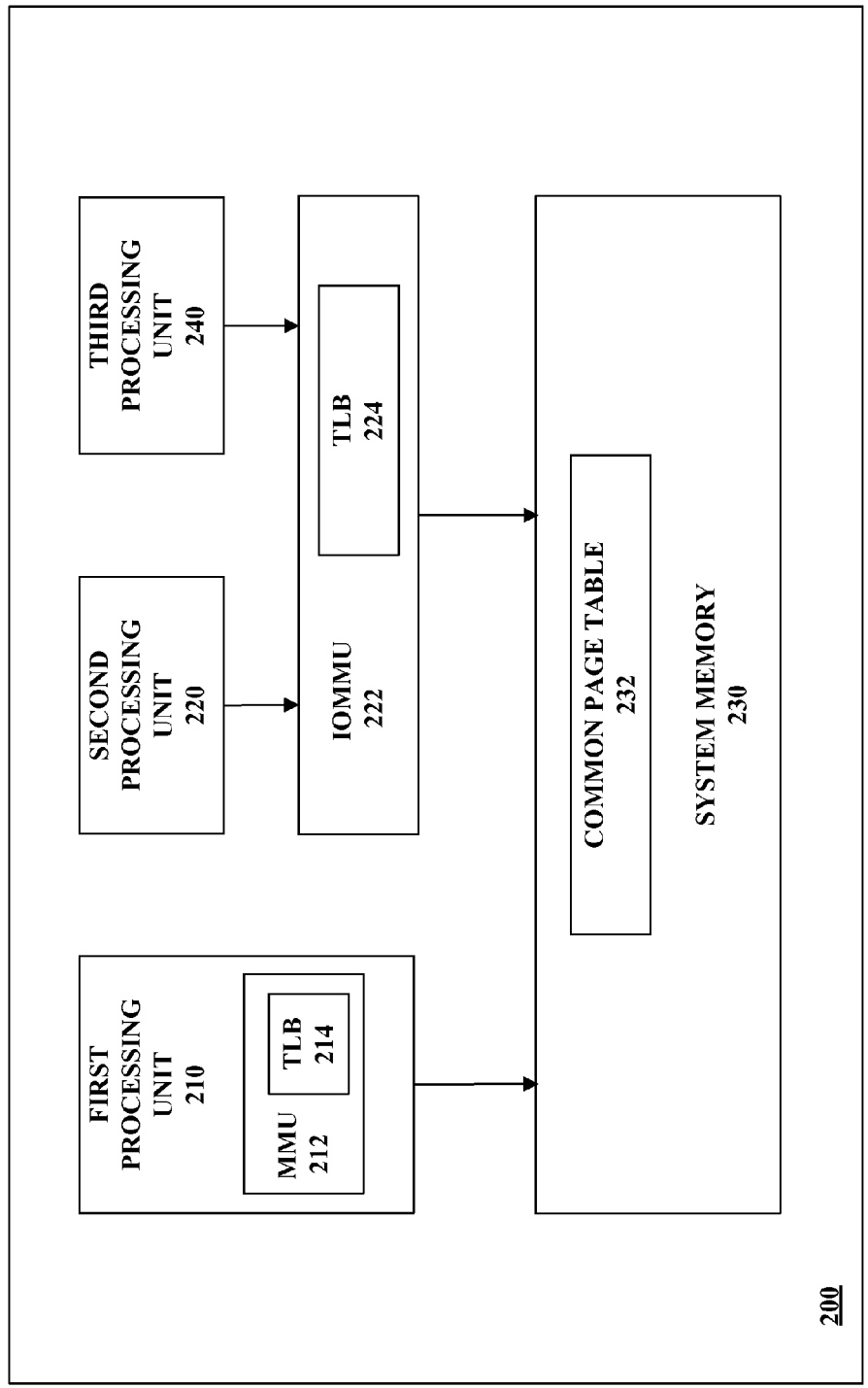
FIG. 2 shows another example of a computing device configured to implement the virtual memory address to physical memory address mapping techniques described in this disclosure.

FIG. 2 shows another example computing device, computing device 200, that may implement the techniques of this disclosure. Examples of computing device 200 include, but are not limited to, mobile wireless telephones, personal digital assistants (PDAs), video gaming consoles, handheld gaming units, mobile video conferencing units, laptop computers, desktop computers, television set-top boxes, digital media players, smartphones, tablet computers, and the like. Computing device 200 includes a first processing unit 210, a second processing unit 220, a third processing unit 240, an input/output memory management unit (IOMMU) 222, and a system memory 230. First processing unit 210 includes MMU 212. Second processing unit 220 and third processing unit 240 do not each have a dedicated MMU but instead share a common MMU (i.e. IOMMU 222 in FIG. 2). First processing unit 210 may, for example, be a CPU of device 200.

Second processing unit 120 may, for example, be a GPU operable to output graphics data for presentation on a display. Third processing unit 240 may, for example, be a third type of processing unit such as a processing unit for a peripheral device. Examples of first processing unit 210, second processing unit 220, and third processing unit 240 may include, but are not limited to, a digital signal processor (DSP), a general purpose microprocessor, application specific integrated circuit (ASIC), field programmable logic array (FPGA), or other equivalent integrated or discrete logic circuitry.

System memory 230 may be an example of a computer-readable storage medium. System memory 230 may, for example, be a type of random access memory (RAM) such as dynamic RAM, static RAM, thyrisistor RAM, zero-capacitor RAM, twin transistor RAM, or some other type of volatile memory. System memory 230 may also be a non-volatile memory, such as a flash memory or other type of non-volatile RAM. System memory 230 may store instructions that cause processing unit 210 and processing unit 220 to perform functions ascribed to each in this disclosure. In this way, system memory 230 may be considered as a computer-readable storage medium comprising instructions that cause one or more processors, e.g., processing unit 210, processing unit 220, and/or processing unit 240, to perform various functions. In some examples, however, such instruction may be stored in a memory (not shown in FIG. 2) other than system memory 230.

First processing unit 210, second processing unit 220, and third processing unit 240 are configured to read data from and write data to system memory 230. To read or write the data, first processing unit 210, second processing unit 220, and third processing unit 240 are configured to access specific physical locations in system memory 230. These specific locations may, for example, be chunks of 4 KB, and each chunk may have its own unique physical address. As introduced above, however, first processing unit 210, second processing unit 220, and third processing unit 240 may implement virtual addressing, such that jobs of applications executing on first processing unit 210, second processing unit 220, and/or third processing unit 240 are assigned contiguous virtual memory addresses. The physical memory addresses corresponding to these contiguous virtual memory addresses may, however, be fragmented and non-contiguous. Thus, processing unit 210, processing unit 220, and third processing unit 240 may process data using these contiguous virtual memory addresses rather than the corresponding non-contiguous physical memory addresses. When processing unit 210, processing unit 220, and processing unit 240 need to access (i.e. read from or write to) system memory 230, however, these virtual memory addresses need to be translated to physical memory addresses.

MMU 212 is configured to map virtual memory addresses to physical memory addresses for first processing unit 210. IOMMU 222 is configured to map virtual memory addresses to physical memory addresses for both second processing unit 220 and third processing unit 230. A complete page table with a full set of page entries is stored in common page table 232. Each of TLB 214 and TLB 224 store a subset of the page entries stored in common page table 232. The subset may, for example, be recently accessed page entries, frequently accessed page entries, or page entries selected based on some other criteria.

If, for example, first processing unit 210 needs to translate a virtual memory address to a physical memory address, then MMU 212 may use TLB 214 to determine the physical memory address that corresponds to a particular virtual memory address when TLB 214 stores the page entry for that virtual memory address. Using the determined physical memory address, processing unit 210 can read from or write to system memory 230. Similarly, if second processing unit 220 or third processing unit 240 need to translate a virtual memory address to a physical memory address, then MMU 222 may use TLB 224 to determine the physical memory address that corresponds to a particular virtual memory address when TLB 224 stores the page entry for that virtual memory address. Using the determined physical memory address, second processing unit 220 and third processing unit 240 can read from or write to system memory 230.

As introduced above, TLB 214 and TLB 224 may be caches that store the virtual-to-physical mappings for only a subset of virtual memory addresses. TLB 214 therefore, may not store the entire virtual-to-physical mapping for first processing unit 210, and similarly, TLB 224 may not store the entire virtual-to-physical mapping for second processing unit 220 and third processing unit 240. In some instances, MMU 212 may need to determine a corresponding physical memory address for a virtual memory address that does not have a mapping stored in TLB 214. To determine a mapping for a virtual memory address not included in TLB 214, MMU 212 accesses common page table 232 stored in system memory 230. Common page table 232 includes the entire virtual-to-physical mapping for processing unit 210, and therefore, may be much larger than TLB 214.

As with first processing unit 210, in some instances second processing unit 220 may need to determine a corresponding physical memory address for a virtual memory address that does not have a mapping stored in TLB 224. To determine a mapping for a virtual memory address not included in TLB 224, MMU 222 accesses common page table 232 stored in system memory 230. Common page table 232 includes the entire virtual-to-physical mapping for first processing unit 210 as well as for second processing unit 220 and third processing unit 240. In this manner, first processing unit 210, second processing unit 220, and third processing unit 240 share the same page table (i.e. common page table 232 in the example of FIG. 2).

Common page table 232 may include a plurality of page entries that map a virtual memory address to a physical memory address of a memory chunk. Each page entry may include a first set of attribute bits and a second set of attribute bits. The first set of attribute bits may set controls, such as permissions and access rights, for first processing unit 210 while the second set of attribute bits sets controls for second processing unit 220 and third processing unit 240. Each page entry may optionally include one or more additional sets of attribute bits, such as a set of attribute bits that set common controls for all of first processing unit 210, second processing unit 220, and third processing unit 240.

In some examples, the second set of attributes may set controls for all processing units that share IOMMU 222. Thus, in such an example, the second set of attribute bits define the controls for both second processing unit 220 and third processing unit 240. In other examples, however, second processing unit 220 and third processing unit 240 may each have a dedicated set of attribute bits. In such an example, the second set of attributes may set the controls for second processing unit 220, while a third set of attribute bits may set the controls for third processing unit 240.

The first set of attribute bits and the second set of attribute bits for page entries of common page table 232 may enable first processing unit 210 to have different permissions and access rights than second processing unit 220 and third processing unit 240 while sharing a common page table with second processing unit 220 and third processing unit 240. As one example, the first set of attribute bits may be set such that first processing unit 210 has both read and write access to a particular memory chunk of system memory 230, while second processing unit 220 and third processing unit 240 may have only read access to the same particular memory chunk. Of course, other configurations are also possible, such as second processing unit 220 and third processing unit 240 having both read and write access while first processing unit 210 has only read access or second processing unit 220 and third processing unit 240 having both read and write access while the first processing unit 210 has neither read access nor write access.

Figure 3:
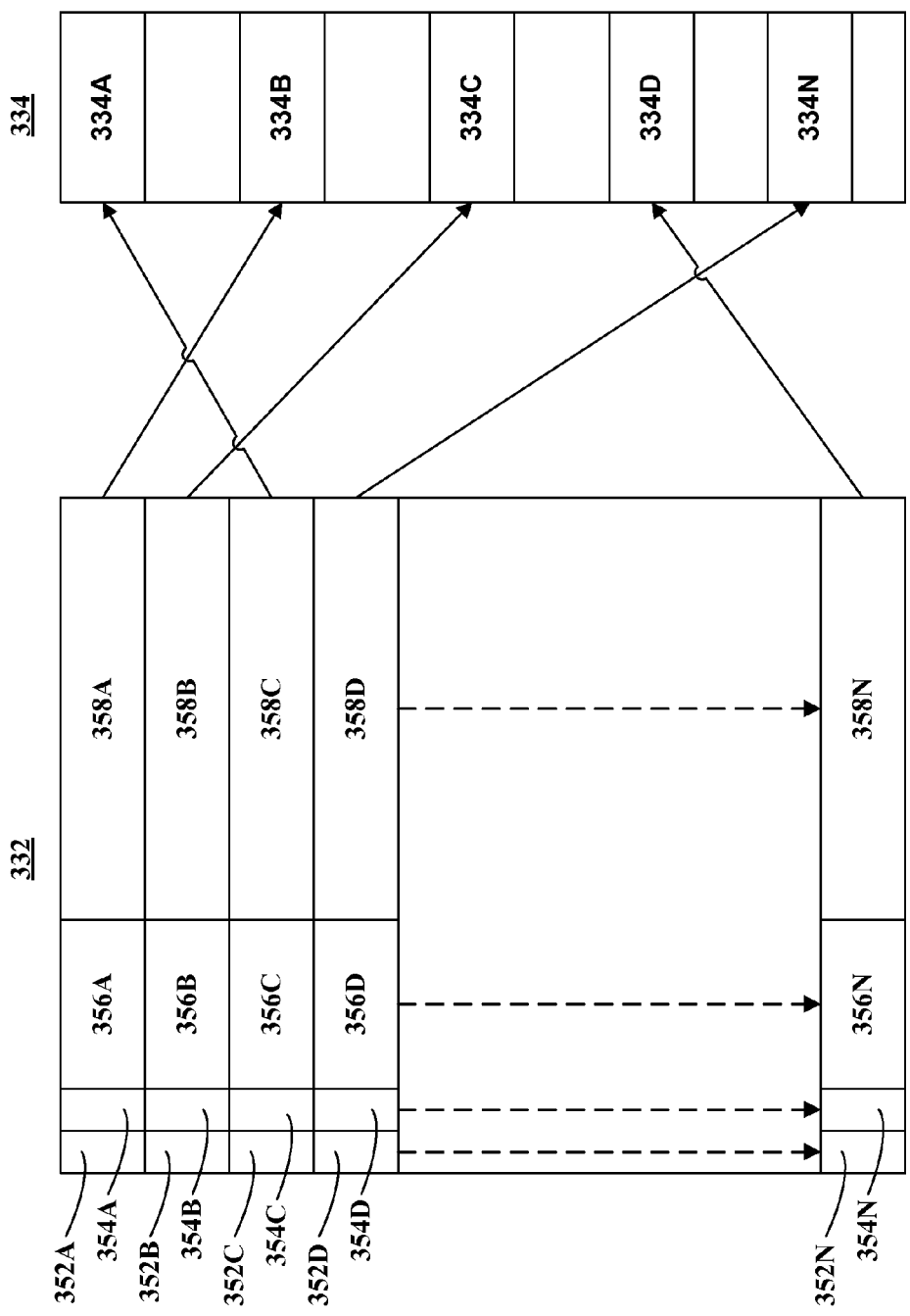
FIG. 3 shows a conceptual diagram of a common page table with multiple sets of attribute fields within a single page table entry according to the techniques described in this disclosure.

FIG. 3 is a conceptual diagram illustrating aspects of common page table 332. Common page table may represent either common page table 132 of FIG. 1 or common page table 232 of FIG. 2. FIG. 3 is intended to be conceptual for the purpose of explanation and should not be interpreted as representing an actual data structure. Common page table 332 includes a plurality of page entries. Each page entry includes first set of attribute bits 352A-N, second set of attribute bits 354A-N, a third set of attribute bits 356A-N, and physical memory address bits 358A-N. Thus first set of attribute bits 352A, second set of attribute bits 354A, third set of attribute bits 356A, and physically memory address bits 358A collectively constitute page entry A. First set of attribute bits 352B, second set of attribute bits 354B, third set of attribute bits 356B, and physically memory address bits 358B collectively constitute page entry B, and so on. As discussed above, each of page entries 356A-N may be 32 bits, 40 bits, or some other size. Physical memory address bits 358A-N may each be 20 bits or some other size, and various sizes may be used for each of first set of attribute bits 352A-N, second set of attribute bits 354A-N, and third set of attribute bits 356A-N.

System memory 334 in FIG. 3 represents physical memory with memory chunks 134A-N. System memory 334 may, for example, correspond to system memory 130 of FIG. 1 or system memory 230 of FIG. 2. Memory chunks 134A-N are intended to represent non-contiguous chunks of memory 334, meaning the physical memory addresses of memory chunks 334A-N may be non-contiguous. Each of page entries A-N includes the physical address of one of memory chunks 334A-N in physical memory address bits 358A-N.

Each of page entries A-N corresponds to a virtual memory address. When a processing unit, such as first processing unit 110 or second processing unit 120 of FIG. 1, needs to access system memory, it can use page table 332 to find the corresponding physical memory address for a virtual memory address. If, for example, first processing unit 110 needs to translate a particular virtual memory address to a physical memory address, then first processing unit 110 reads the page entry corresponding to that particular virtual memory address.

In this example, assume that page entry A corresponds to the particular virtual memory address. First processing unit 110 may thus read page entry A to determine the corresponding physical memory address, which is stored in physical memory address bits 358A. In the example, of FIG. 3, entry A maps to the physical memory address where physical memory chunk 334B is stored. Thus, physical memory address bits 358A store a physical address to where memory chunk 334B is located within system memory 334. First attribute bits 352A set the permissions for first processing unit 110 when accessing physical memory chunk 334B. For example, a first bit might determine if first processing unit 110 has read privileges for memory chunk 334B. A second bit might determine if first processing unit 110 has write privileges for memory chunk 334B.

In some instances, second processing unit 120 may need to translate the same particular virtual memory address translated by first processing unit 110. To do so, second processing unit 120 may read the same page entry corresponding to that particular virtual memory address that first processing unit 110 read when translating the particular virtual memory address.

In this example, again assume that page entry A corresponds to the particular virtual memory address. Second processing unit 120 may thus read page entry A to determine the corresponding physical memory address, which is stored in physical memory bits 358A. In the example, of FIG. 3, entry A maps to physical memory chunk 334B. Thus, physical memory address bits 358A store a physical address of memory chunk 334B. Second attribute bits 354A define the permissions for second processing unit 120 when accessing physical memory chunk 334B. For example, a first bit of second attribute bits 356A might determine if second processing unit 120 has read privileges for memory chunk 334B. A second bit of second attribute bits 356A might determine if second processing unit 120 has write privileges for memory chunk 334B. In this manner, even though first processing unit 110 and second processing unit 120 are accessing the same page entry in the same page table to translate a virtual memory address to a physical memory address, first processing unit 110 and second processing unit 120 may have different privileges, such as different read and write access, for the same memory chunk.

In another example, when a processing unit, such as first processing unit 210 or one of second processing unit 220 or third processing unit 240 of FIG. 2, needs to access system memory, it can use page table 332 to find the corresponding physical memory address for a virtual memory address. In such an example, first attribute bits 352A-N may define the permissions for first processing unit 210, while second attribute bits 354A-N may define the permissions for both second processing unit 220 and third processing unit 240. Thus, when second processing unit 220 needs to access a physical memory chunk of memory 334, second attribute bits 354A-N define the permissions for second processing unit 220. Similarly, when third processing unit 240 needs to access a physical memory chunk of memory 334, second attribute bits 354A-N also define the permissions for third processing unit 240.

Figure 4:
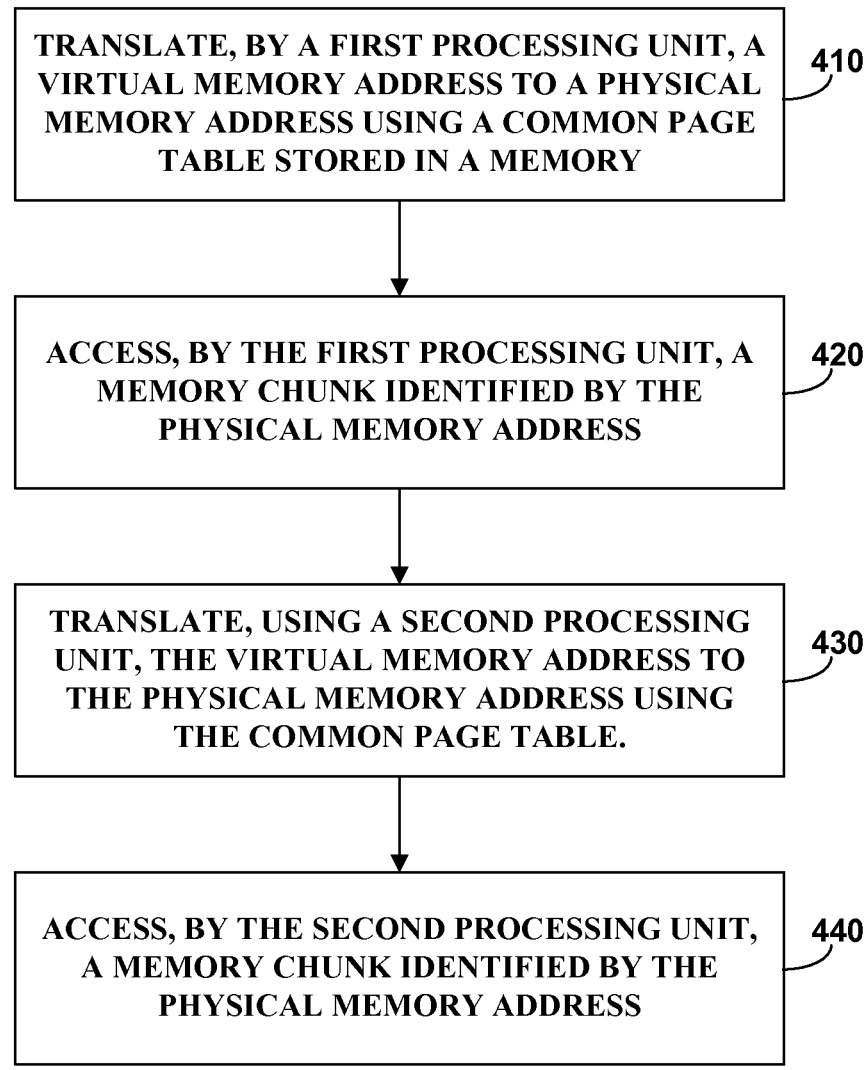
FIG. 4 shows a flow diagram illustrating virtual memory address to physical memory address mapping techniques described in this disclosure.

FIG. 4 shows a flow diagram illustrating the virtual-to-physical mapping techniques describes in this disclosure. The techniques of FIG. 4 can be performed by a computing device with two or more processing units, such as computing device 100 of FIG. 1 or computing device 200 of FIG. 2. The techniques of FIG. 4 will be described with reference to computing device 100, although it should be understood that the techniques of FIG. 4 are applicable to a wide array of computing devices and not limited only to devices configured as computing device 100.

First processing unit 110 via MMU 112 translates a virtual memory address to a physical memory address using a common page table stored in a memory (410). The common page table is common to first processing unit 110 and second processing unit 120 and stores virtual memory addresses to physical memory addresses mapping for memory chunks accessed by an application. The application may be executing on both first processing unit 110 and second processing unit 120. The common page table includes a page entry that first processing unit 110 and second processing unit 120 use to access the memory chunk. The page entry also includes physical address bits that define a physical address of the memory chunk.

First processing unit 120 accesses a memory chunk identified by the physical memory address (420). The page entry includes a first set of attribute bits that defines accessibility of the memory chunk by the first processing unit. Second processing unit 120 translates the virtual memory address to the physical memory address using the common page table stored in the memory (430). In this manner, first processing unit 110 and second processing unit 120 access the same common page table when translating a virtual memory address to a physical memory address. Second processing unit 120 accesses the memory chunk identified by the physical memory address (440). The page entry includes a second set of attribute bits that defines accessibility of the same memory chunk by the second processing unit. In this example, first processing unit 110 and second processing unit 120 access the same page entry when translating a particular virtual memory address to a physical memory address, but the page entry can have separate attribute bits for first processing unit 110 and second processing unit 120. The page entry may also include a third set of attribute bits that define attributes that are common to both first processing unit 110 and second processing unit 120.

In the example of FIG. 4, first processing unit 110 may be a CPU, and second processing unit 120 may be a GPU. The first set of attribute bits may define if first processing unit 110 has write access to the memory chunk and define if first processing unit 110 has read access to the memory chunk. The second set of attribute bits may define if second processing unit 120 has write access to the memory chunk and define if second processing unit 120 has read access to the memory chunk. The accessibility of the memory chunk by first processing unit 110 may be different than the accessibility of the memory chunk by second processing unit 120. For example, based on the first set of attributes, first processing unit 110 may have read access and write access to the memory chunk, while based on the second set of attributes second processing unit 120 has read-only access to the memory chunk.

First processing unit 110 may include a first MMU (e.g. MMU 112), and second processing unit 120 may include a second MMU (e.g. MMU 122). The first MMU may be configured to access the common page table, and the second MMU may also be configured to access the same common page table.

Examples of system memory 26 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. System memory 26 may, in some examples, be considered as a non-transitory storage medium. The term "non-transitory" may indicate that the storage medium is not embodied in a carrier wave or a propagated signal. However, the term "non-transitory" should not be interpreted to mean that system memory 26 is non-movable. As one example, system memory 26 may be removed from device 10, and moved to another device. As another example, a storage device, substantially similar to system memory 26, may be inserted into device 10. In certain examples, a non-transitory storage medium may store data that can, over time, change (e.g., in RAM).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus comprising:
a first processing unit, wherein the first processing unit comprises a central processing unit (CPU);
a second processing unit, wherein the second processing unit comprises a graphics processing unit (GPU); and
a memory that stores:
a page entry, within a common page table, that the first processing unit and the second processing unit use to access a memory chunk, wherein the page entry comprises a first set of attribute bits that defines accessibility of the memory chunk by the first processing unit, a second set of attribute bits that defines accessibility of the same memory chunk by the second processing unit, and physical address bits that define a physical address of the memory chunk within the memory, wherein the accessibility of the memory chunk by the first processing unit, as defined by the first set of attribute bits, is different than the accessibility of the memory chunk by the second processing unit, as defined by the second set of attribute bits.

2. The apparatus of claim 1, wherein the page entry comprises a third set of attribute bits that define attributes that are common to both the first processing unit and the second processing unit.

3. The apparatus of claim 1, wherein the first set of attribute bits define if the first processing unit has write access to the memory chunk and define if the first processing unit has read access to the memory chunk, and wherein the second set of attribute bits define if the second processing unit has write access to the memory chunk and define if the second processing unit has read access to the memory chunk.

4. The apparatus of claim 1, wherein the first set of attribute bits define that the first processing unit has read access and write access to the memory chunk, and wherein the second set of attribute bits define that the second processing unit has read-only access to the memory chunk.

5. The apparatus of claim 1, wherein the first processing unit comprises a first memory management unit (MMU) and the second processing unit comprises a second MMU, wherein the first MMU is configured to access the common page table and the second MMU is configured to access the common page table.

6. The apparatus of claim 1, further comprising:
a first memory management unit (MMU), wherein the first processing unit comprises the first MMU;
a third processing unit;
an input/output MMU (IOMMU), wherein the IOMMU is shared by the second processing unit and the third processing unit;
wherein the first MMU is configured to access the common page table and the IOMMU is configured to access the common page table.

7. The apparatus of claim 1, wherein the application is executing on both the first processing unit and the second processing unit.

8. A method comprising:
translating, by a first processing unit, a virtual memory address to a physical memory address using a common page table stored in a memory, wherein the first processing unit comprises a central processing unit (CPU);
accessing, by the first processing unit, a memory chunk identified by the physical memory address;
translating, by a second processing unit, the virtual memory address to the physical memory address using the common page table stored in the memory, wherein the second processing unit comprises a graphics processing unit (GPU);
accessing, by the second processing unit, the memory chunk identified by the physical memory address;
wherein the common page table is common to the first processing unit and the second processing unit and stores virtual memory addresses to physical memory addresses mapping for memory chunks accessed by a job of an application; and
wherein the common page table comprises a page entry that the first processing unit and the second processing unit use to access the memory chunk, wherein the page entry comprises a first set of attribute bits that defines accessibility of the memory chunk by the first processing unit, a second set of attribute bits that defines accessibility of the same memory chunk by the second processing unit, and physical address bits that define a physical address of the memory chunk, wherein the accessibility of the memory chunk by the first processing unit, as defined by the first set of attribute bits, is different than the accessibility of the memory chunk by the second processing unit, as defined by the second set of attribute bits.

9. The method of claim 8, wherein the page entry comprises a third set of attribute bits that define attributes that are common to both the first processing unit and the second processing unit.

10. The method of claim 8, wherein the first set of attribute bits define if the first processing unit has write access to the memory chunk and define if the first processing unit has read access to the memory chunk; and, wherein the second set of attribute bits define if the second processing unit has write access to the memory chunk and define if the second processing unit has read access to the memory chunk.

11. The method of claim 8, wherein based on the first set of attributes, the first processing unit has read access and write access to the memory chunk, and wherein based on the second set of attributes the second processing unit has read-only access to the memory chunk.

12. The method of claim 8, wherein the first processing unit comprises a first memory management unit (MMU) and the second processing unit comprises a second MMU, wherein the first MMU is configured to access the common page table and the second MMU is configured to access the common page table.

13. The method of claim 8, further comprising:
translating, by a third processing unit, a second virtual memory address to a second physical memory address using the common page table stored in the memory;
accessing, by the third processing unit, a memory chunk identified by the second physical memory address;
wherein the second processing unit and the third processing unit share an input/output MMU (IOMMU), and wherein the IOMMU is configured to access the common page table.

14. The method of claim 8, wherein the application is executing on both the first processing unit and the second processing unit.

15. An apparatus comprising:
first processing means;
second processing means;
a memory;

wherein the first processing means comprises
  first means for translating a virtual memory address to a physical memory address using a common page table stored in the memory;
  first means for accessing a memory chunk identified by the physical memory address,
  wherein the first processing means comprises a central processing unit (CPU);
wherein the second processing means comprises
  second means for translating the virtual memory address to the physical memory address using the common page table stored in the memory;
  second means for accessing the memory chunk identified by the physical memory address,
  wherein the second processing means comprises a graphics processing unit (GPU);
wherein the common page table is common to the first processing means and the second processing means and stores virtual memory addresses to physical memory addresses mapping for memory chunks accessed by a job of an application; and
wherein the common page table comprises a page entry that the first processing means and the second processing means use to access the memory chunk, wherein the page entry comprises a first set of attribute bits that defines accessibility of the memory chunk by the first processing means, a second set of attribute bits that defines accessibility of the same memory chunk by the second processing means, and physical address bits that define a physical address of the memory chunk, wherein the accessibility of the memory chunk by the first processing unit, as defined by the first set of attribute bits, is different than the accessibility of the memory chunk by the second processing unit, as defined by the second set of attribute bits.

16. The apparatus of claim 15, wherein the page entry comprises a third set of attribute bits that define attributes that are common to both the first processing means and the second processing means.

17. The apparatus of claim 15, wherein the first set of attribute bits define if the first processing means has write access to the memory chunk and define if the first processing means has read access to the memory chunk; and, wherein the second set of attribute bits define if the second processing means has write access to the memory chunk and define if the second processing means has read access to the memory chunk.

18. The apparatus of claim 15, wherein based on the first set of attributes, the first processing means has read access and write access to the memory chunk, and wherein based on the second set of attributes the second processing means has read-only access to the memory chunk.

19. The apparatus of claim 15, wherein the first processing means comprises a first memory management unit (MMU) and the second processing means comprises a second MMU, wherein the first MMU is configured to access the common page table and the second MMU is configured to access the common page table.

20. The apparatus of claim 15, further comprising:
  third processing means, wherein the third processing means comprises
    second means for translating a second virtual memory address to a second physical memory address using the common page table stored in the memory;
    the second means for accessing the memory chunk identified by the second physical memory address.

21. The apparatus of claim 15, wherein the application is executing on both the first processing means and the second processing means.

22. A non-transitory computer-readable storage medium having stored thereon instructions that when executed cause a first processing unit and a second processing unit to:
  translate, by the first processing unit, a virtual memory address to a physical memory address using a common page table stored in a memory, wherein the first processing unit comprises a central processing unit (CPU);
  access, by the first processing unit, a memory chunk identified by the physical memory address;
  translate, by the second processing unit, the virtual memory address to the physical memory address using the common page table stored in the memory, wherein the second processing unit comprises a graphics processing unit (GPU);
  access, by the second processing unit, the memory chunk identified by the physical memory address;
  wherein the common page table is common to the first processing unit and the second processing unit and stores virtual memory addresses to physical memory addresses mapping for memory chunks accessed by a job of an application; and
  wherein the common page table comprises a page entry that the first processing unit and the second processing unit use to access the memory chunk, wherein the page entry comprises a first set of attribute bits that defines accessibility of the memory chunk by the first processing unit, a second set of attribute bits that defines accessibility of the same memory chunk by the second processing unit, and physical address bits that define a physical address of the memory chunk, wherein the accessibility of the memory chunk by the first processing unit, as defined by the first set of attribute bits, is different than the accessibility of the memory chunk by the second processing unit, as defined by the second set of attribute bits.

23. The non-transitory computer-readable storage medium of claim 22, wherein the page entry comprises a third set of attribute bits that define attributes that are common to both the first processing unit and the second processing unit.

24. The non-transitory computer-readable storage medium of claim 22, wherein the first set of attribute bits define if the first processing unit has write access to the memory chunk and define if the first processing unit has read access to the memory chunk; and, wherein the second set of attribute bits define if the second processing unit has write access to the memory chunk and define if the second processing unit has read access to the memory chunk.

25. The non-transitory computer-readable storage medium of claim 22, wherein based on the first set of attributes, the first processing unit has read access and write access to the memory chunk, and wherein based on the second set of attributes the second processing unit has read-only access to the memory chunk.

26. The non-transitory computer-readable storage medium of claim 22, wherein the first processing unit comprises a first memory management unit (MMU) and the second processing unit comprises a second MMU, wherein the first MMU is configured to access the common page table and the second MMU is configured to access the common page table.

27. The non-transitory computer-readable storage medium of claim 22 having stored thereon additional instructions that when executed cause a third processing unit to:

translate, by the third processing unit, a second virtual memory address to a second physical memory address using the common page table stored in the memory;
access, by the third processing unit, a memory chunk identified by the second physical memory address;
wherein the second processing unit and the third processing unit share an input/output MMU (IOMMU), and wherein the IOMMU is configured to access the common page table.

28. The non-transitory computer-readable storage medium of claim 22, wherein the application is executing on both the first processing unit and the second processing unit.

* * * * *